(12) United States Patent
Keyser et al.

(10) Patent No.: US 7,535,576 B2
(45) Date of Patent: May 19, 2009

(54) INTEGRATED OPTICAL ROTATION SENSOR AND METHOD FOR SENSING ROTATION RATE

(75) Inventors: Thomas Keyser, Plymouth, MN (US); Glen A. Sanders, Scottsdale, AZ (US); Grenville Hughes, Wayzata, MN (US); Lee K. Strandjord, Tonka Bay, MN (US)

(73) Assignee: Honeywell International, Inc., Morristown, NJ (US)

( * ) Notice: Subject to any disclaimer, the term of this patent is extended or adjusted under 35 U.S.C. 154(b) by 337 days.

(21) Appl. No.: 11/433,965

(22) Filed: May 15, 2006

(65) Prior Publication Data
US 2007/0263224 A1  Nov. 15, 2007

(51) Int. Cl.
G01C 19/72 (2006.01)
G01C 19/66 (2006.01)
G02B 6/00 (2006.01)

(52) U.S. Cl. .................. 356/461; 356/469; 356/470; 385/12

(58) Field of Classification Search ......... 356/459–461, 356/469, 470; 385/12
See application file for complete search history.

(56) References Cited

U.S. PATENT DOCUMENTS

| | | | |
|---|---|---|---|
| 4,234,357 A | 11/1980 | Scheppele | |
| 4,315,693 A | 2/1982 | Walker | |
| 4,326,803 A | 4/1982 | Lawrence | |
| 4,673,293 A | 6/1987 | Sanders | |
| 4,886,345 A | 12/1989 | Popek | |
| 4,958,898 A | 9/1990 | Friedman et al. | |
| 5,029,978 A | 7/1991 | Curtis et al. | |
| 5,090,810 A | 2/1992 | Malvern | |
| 5,143,577 A | 9/1992 | Haas et al. | |
| 5,163,118 A | 11/1992 | Lorenzo et al. | |
| 5,319,727 A * | 6/1994 | Ford et al. | 385/30 |
| 5,383,048 A | 1/1995 | Seaver | |

(Continued)

FOREIGN PATENT DOCUMENTS

GB    2355312 A1    4/2001

(Continued)

OTHER PUBLICATIONS

Krause et al., "Leakage Loss in Trench-Bulge Waveguides", Journal of Lightwave Technology, vol. 23, Issue 5, May 2005, pp. 1890-1895.*

(Continued)

Primary Examiner—Patrick J Connolly
(74) Attorney, Agent, or Firm—Black Lowe & Graham PLLC (57) ABSTRACT

Methods and apparatus are provided for a low cost optical gyro using thin film waveguides to direct light beams among the components of the gyro. The gyro includes a substrate having an insulator layer, a silicon waveguide formed on the insulator layer, and a resonator coupled to the silicon waveguide and configured to circulate a portion of a first light beam in a first counter-propagating direction and circulate a portion of a second light beam in a second counter-propagating direction. The first silicon waveguide propagates the first and second light beams therethrough. Each of the first and second light beams has a resonance frequency when circulating in the resonator.

20 Claims, 4 Drawing Sheets

U.S. PATENT DOCUMENTS

| | | | |
|---|---|---|---|
| 5,408,566 A | 4/1995 | Eda et al. |
| 5,429,981 A | 7/1995 | Gardner et al. |
| 5,500,544 A | 3/1996 | Park et al. |
| 5,696,662 A | 12/1997 | Bauhahn |
| 5,793,060 A | 8/1998 | Morikawa |
| 5,841,931 A | 11/1998 | Foresi et al. |
| 5,861,651 A | 1/1999 | Brasen |
| 5,908,305 A | 6/1999 | Crampton et al. |
| 6,063,299 A | 5/2000 | Drake et al. |
| 6,108,212 A | 8/2000 | Lach et al. |
| 6,147,362 A | 11/2000 | Keyser |
| 6,150,266 A | 11/2000 | Lin et al. |
| 6,163,632 A * | 12/2000 | Rickman et al. ............. 385/14 |
| 6,259,089 B1 * | 7/2001 | Vali et al. ............. 250/231.12 |
| 6,270,604 B1 | 8/2001 | McCallion et al. |
| 6,311,003 B1 | 10/2001 | Dubey et al. |
| 6,323,985 B1 | 11/2001 | Maloney |
| 6,372,609 B1 | 4/2002 | Aga et al. |
| 6,418,999 B1 | 7/2002 | Yanagita et al. |
| 6,493,089 B2 | 12/2002 | Numai |
| 6,493,502 B1 | 12/2002 | Deliwala |
| 6,526,187 B1 | 2/2003 | Deliwala |
| 6,546,538 B1 | 4/2003 | Rubdi et al. |
| 6,566,155 B1 | 5/2003 | Numai |
| 6,603,166 B2 | 8/2003 | Fechner et al. |
| 6,603,889 B2 | 8/2003 | Deliwala |
| 6,608,945 B2 | 8/2003 | Deliwala |
| 6,611,636 B2 | 8/2003 | Deliwala |
| 6,625,348 B2 | 9/2003 | Deliwala |
| 6,627,954 B1 | 9/2003 | Seefeldt |
| 6,646,747 B2 | 11/2003 | Deliwala |
| 6,654,511 B2 | 11/2003 | Deliwala |
| 6,656,747 B2 | 12/2003 | Sameshima |
| 6,658,173 B2 | 12/2003 | Delwala |
| 6,671,443 B2 | 12/2003 | Deliwala |
| 6,690,844 B2 | 2/2004 | Deliwala |
| 6,690,863 B2 | 2/2004 | Deliwala |
| 6,693,225 B2 | 2/2004 | Boyer et al. |
| 6,738,546 B2 | 5/2004 | Deliwala |
| 6,748,125 B2 | 6/2004 | Deliwala |
| 6,760,498 B2 | 7/2004 | Delwala |
| 6,816,636 B2 | 11/2004 | Cole et al. |
| 6,819,814 B2 | 11/2004 | Forrest et al. |
| 6,823,112 B2 | 11/2004 | Deliwala |
| 6,826,320 B2 | 11/2004 | Deliwala |
| 6,842,546 B2 | 1/2005 | Deliwala |
| 6,845,198 B2 | 1/2005 | Montgomery et al. |
| 6,850,683 B2 | 2/2005 | Lee et al. |
| 6,868,214 B1 | 3/2005 | Sakata et al. |
| 6,869,881 B2 | 3/2005 | Deliwala |
| 6,879,751 B2 | 4/2005 | Deliwala |
| 6,888,219 B2 | 5/2005 | Keyser |
| 6,890,450 B2 | 5/2005 | Naydenkov et al. |
| 6,891,685 B2 | 5/2005 | Deliwala |
| 6,891,985 B2 | 5/2005 | Delwala |
| 6,895,136 B2 | 5/2005 | Deliwala |
| 6,897,498 B2 | 5/2005 | Gotheskar et al. |
| 6,898,352 B2 | 5/2005 | Deliwala |
| 6,912,330 B2 | 6/2005 | Deliwala |
| 6,917,727 B2 | 7/2005 | Gunn, III et al. |
| 6,917,730 B2 | 7/2005 | Ghiron et al. |
| 6,919,238 B2 | 7/2005 | Bohr |
| 6,934,444 B2 | 8/2005 | Ghiron et al. |
| 6,944,369 B2 | 9/2005 | Deliwala |
| 6,947,615 B2 | 9/2005 | Deliwala |
| 6,963,118 B2 | 11/2005 | Deliwala et al. |
| 6,968,110 B2 | 11/2005 | Patel et al. |
| 6,980,720 B2 | 12/2005 | Gothoskar et al. |
| 6,987,910 B2 | 1/2006 | Shappir et al. |
| 6,993,225 B2 | 1/2006 | Patel et al. |
| 6,993,243 B2 | 1/2006 | Delwala |
| 7,000,207 B2 | 2/2006 | Gothoskar et al. |
| 7,003,196 B2 | 2/2006 | Ghiron et al. |
| 7,013,067 B2 | 3/2006 | Ghiron et al. |
| 7,020,364 B2 | 3/2006 | Ghiron et al. |
| 7,079,742 B1 | 7/2006 | Gunn, III et al. |
| 7,106,448 B1 * | 9/2006 | Vawter et al. ............. 356/461 |
| 7,118,682 B2 | 10/2006 | Patel et al. |
| 7,149,388 B2 | 12/2006 | Keyser et al. |
| 7,177,489 B2 | 2/2007 | Keyser et al. |
| 7,217,584 B2 | 5/2007 | Yue et al. |
| 7,330,271 B2 * | 2/2008 | Frick ............. 356/480 |
| 2002/0003650 A1 | 1/2002 | Usami et al. |
| 2002/0164143 A1 | 11/2002 | Csutak et al. |
| 2002/0172464 A1 | 11/2002 | Delwala |
| 2002/0185675 A1 | 12/2002 | Furukawa |
| 2003/0026571 A1 | 2/2003 | Bazylenko |
| 2003/0054639 A1 | 3/2003 | Deliwala |
| 2003/0059190 A1 | 3/2003 | Gunn, III et al. |
| 2003/0063364 A1 | 4/2003 | Kambe |
| 2003/0081924 A1 | 5/2003 | Yegnanarayanan |
| 2003/0098289 A1 | 5/2003 | Zheng et al. |
| 2003/0102079 A1 | 6/2003 | Kalvesten et al. |
| 2003/0151793 A1 | 8/2003 | Sugiyama et al. |
| 2003/0184950 A1 | 10/2003 | Nakamura |
| 2003/0207215 A1 | 11/2003 | Xu et al. |
| 2003/0223671 A1 | 12/2003 | Morse |
| 2004/0002197 A1 | 1/2004 | Fathimulla et al. |
| 2004/0021157 A1 | 2/2004 | Yue et al. |
| 2004/0126051 A1 | 7/2004 | Bruel |
| 2004/0151463 A1 | 8/2004 | Talin et al. |
| 2004/0223768 A1 | 11/2004 | Shastri et al. |
| 2004/0258347 A1 | 12/2004 | Gothoskar et al. |
| 2005/0094939 A1 | 5/2005 | Ghiron et al. |
| 2005/0110108 A1 | 5/2005 | Patel et al. |
| 2005/0123232 A1 | 6/2005 | Piede et al. |
| 2005/0123259 A1 | 6/2005 | Gunn, III et al. |
| 2005/0135727 A1 | 6/2005 | Piede et al. |
| 2005/0152658 A1 | 7/2005 | Keyser |
| 2005/0179986 A1 | 8/2005 | Gothoskar et al. |
| 2005/0189591 A1 | 9/2005 | Gotheskar et al. |
| 2005/0194990 A1 | 9/2005 | Gothoskar et al. |
| 2005/0213873 A1 | 9/2005 | Peide et al. |
| 2005/0214989 A1 | 9/2005 | Keyser |
| 2005/0236619 A1 | 10/2005 | Patel et al. |
| 2005/0289490 A1 | 12/2005 | Shastri et al. |
| 2006/0018597 A1 | 1/2006 | Piede et al. |
| 2006/0038144 A1 | 2/2006 | Maddison |
| 2006/0063679 A1 | 3/2006 | Yue et al. |
| 2006/0083144 A1 | 4/2006 | Piede et al. |

FOREIGN PATENT DOCUMENTS

| | | |
|---|---|---|
| JP | 4154178 | 5/1992 |
| JP | 6029018 | 2/1994 |
| WO | 02006909 A2 | 9/2002 |
| WO | 03023468 A2 | 3/2003 |
| WO | 03077015 A1 | 9/2003 |
| WO | 2004088396 A2 | 10/2004 |

OTHER PUBLICATIONS

Grenville Hughes et al., Optical Resonator Gyro With External Cavity Beam Generator, Apr. 18, 2006, 21 pages, U.S. Appl. No. 11/406,939, USA.

Ahmed et al., "Nitrided Thermal SiO2 for Thin Buried Gate Insulator in Dual Gate SOI-MOSFET", University/Government/Industry Microelectronics Symposium, 1999. Proceedings of the Thirteenth Biennial Minneapolis, MN Jun. 20-23, 1999, Piscatatway, NJ, IEEE, Jun. 20, 1999, pp. 43-46.

Ahmed et al., "Nitrided Thermal SiO2 for Use as Top and Bottom Gate Insulators in Self-Aligned Double Gate Silicon-on-Insulator Metal-Oxide-Semiconductor Field Effect Transistor", Journal of Vacuum Science & Technology B (Microelectronics and Nanometer Structures) AIP for American Vacuum Soc., vol. 19, No. 3, May 2001, pp. 800-806.

Celler et al., "Smart Cut TM. A guide to the Technology, the Process, the Products", SOITEC, Jul. 2003, 1-8.

Celler et al., "Strained Silicon on Insulator. A quick Guide to the Technology, the Processes, the Products", SOITEC, Jul. 2003, 1-4.

Hilleringmann et al., "Optoelectronic System Integration on Silicon: Waveguides, Photodetectors, and VLSI CMOS Circutis on One Chip", IEEE Transactions on Electron Devices, 42 (1995) Mai, No. 5, New York, NY, US pp. 841-846.

Joshi et al., "Oxynitride Gate Dielectrics for p+ Polysilicon Gate MOS Devices", IEEE Electron Devices Letters, vol. 14, No. 12, Dec. 1993, pp. 560-562, XP000418671.

Ling Liao et al., "Optical Transmission Losses in Plycrystalline Silicon Strip Waveguides: Effects on Waveguide Dimensions, Thermal Treatment, Hydrogen Passivation, and Wavelength", Journal of Electronic Materials, vol. 29, No. 12, 2002, 1380.

Liu et al., "A High-Speed Silicon Optical Modulator Based on a Metal-Oxide-Semiconductor Capacity," Nature, vol. 427, Feb. 12, 2004. www.nature.com.

Nishihara, Hiroshi, et al., "Optical Integrated Circuits", R.R. Donelley & Sons Company, 1989, pp. 224-235.

Png et al., "Development of Small Silicon Modulators in Silicon-on-Insulator (SOI)", Proceedings of the SPIE, SPIE, Bellingham, VA, vol. 4997, 2003, pp. 190-197.

Reed, G.T., et al., "Silicon on Insulator Optical Waveguides Formed by Direct Wafer Bonding", Materials Science and Engineering B, Elsevier Sequoia, Lausanne, Ch. vol. B15, No. 2, Nov. 1, 1992, pp. 156-159.

Samara-Rubio D., et al., "A Gigahertz Silicon-on-Insulator Mach-Zehnder Modulator", Optical Fiber Communication Conference, 2004. OFC 2004 Los Angeles, CA USA, Feb. 23-25, 2004, IEEE, Feb. 26, 2004, pp. 701-703, XP) 10745963.

Singh Jagar et al., "Design Methodology of the High Performance Large-Grain Polysilicon MOSFET", IEEE Transactions on Electron Devices, vol. 49, No. 5, May 2002, 795-801.

Waldron et al., "Optical Modulator in Silicon-on-Insulator with a Low Thermal Signature", J. Vac. Sci. Thechnol. A 22(3) May/Jun. 2004, 2004 American Vacuum Society.

Liu et al., "Fast Silicon Optical Modulator", Proc. Of the SPIE—Optoelectronic Integration on Silicon—Jul. 2004, vol. 5357, pp. 35-44.

Sanders, Glen A., et al., Optical Gyro with Free Space Resonator and Method for Sensing Inertial Rotation Rate, Nov. 17, 2005, 19 pages, U.S. Appl. No. 11/282,229, USA.

Sanders, Glen A., et al., System and Method for Stabilizing Light Sources In Resonator Gyro, Dec. 9, 2005, 37 pages, U.S. Appl. No. 11/298,439, USA.

Sanders, Glen A., et al., Hollow Core Fiber Optical Gyro, Jan. 6, 2006, 17 pages, U.S. Appl. No. 11/342,158, USA.

Montgomery, Robert, et al., Silicon Electro-Optic Modulator Device, Mar. 25, 2006, U.S. Appl. No. 60/457,242.

Patel, Vipulkumarkatilal, et al., Low Loss SOI/CMOS Compatible Silicon Waveguide, Mar. 28, 2003, U.S. Appl. No. 60/458,501.

Patel, Vipulkumarkatilal, et al., Conventional CMOS Compatible Fabrication Methods for Silicon based Passve Optical and Active Electro-Optic Devices, Apr. 21, 2003, U.S. Appl. No. 60/646,491.

\* cited by examiner

INTEGRATED OPTICAL ROTATION SENSOR AND METHOD FOR SENSING ROTATION RATE

FIELD OF THE INVENTION

The present invention generally relates to gyro systems, and more particularly relates to rotational sensors for use in navigation systems and attitude control.

BACKGROUND OF THE INVENTION

Gyros have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate.

In a resonator fiber optic gyro (RFOG), the counter-propagating light beams are desirably monochromatic (e.g., of a single frequency) and circulate through multiple turns of the fiber optic coil and for multiple passes through the coil using a device that redirects light that has passed through the coil back into the coil again (i.e., circulates the light) such as a fiber coupler. The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves that have traversed the coil a different number of times interfere constructively at any point in the coil. As a result of this constructive interference, an optical wave having a wavelength λ is referred to as "on resonance" when the round trip resonator pathlength is equal to an integral number of wavelengths. A rotation of the coil produces a different pathlength for clockwise and counterclockwise propagation, thus producing a shift between the respective resonance frequencies of the resonator, and the frequency difference, such as may be measured by tuning the difference in the CW beam and CCW beam frequencies to match the resonance frequency shift of the closed optical path due to rotation, indicates the rotation rate.

In the RFOG, the properties of glass material of the optical fiber may cause effects that shift the resonance frequencies of the CW and CCW paths and thus produce a false indication of rotation or inaccurate measurement of rotation rate. A reflective mirror may be used to circulate the counter-propagating light beams in the coil multiple times but this typically reduces the signal-to-noise ratio from losses generated at the transition from the mirror to the coil. Additional anomalies that decrease the accuracy of the measurement of the rotational rate may be generated from a non-linear Kerr effect, stimulated Brillouin scattering, and polarization errors. These error mechanisms are also sensitive to the environment which, for example, gives rise to unwanted temperature sensitivity.

The non-linear Kerr effect occurs when high monochromatic light power inside the RFOG alters the index of refraction of the glass in the optical fiber. A mismatch of intensities of the CW and CCW beams may induce a bias on the observed frequency shifts on the order of several degrees/hour. Stimulated Brillioun scattering (SBS) occurs when a high intensity associated with a high finesse in the fiber resonator causes lasing or stimulated emission in the glass fiber, and this generally promotes large instabilities in the measurement of the resonance frequencies. Polarization-induced errors may result from fiber couplers that incidentally couple light into a second polarization mode, either from one optical fiber to an adjacent optical fiber or within the same fiber. The second polarization mode may resonate to produce an asymmetry in the resonance line shape of the polarization mode used to measure a rotation. Even though the frequency of the second polarization mode is the same for the CW and CCW beams, the amplitude may be different, thus causing different observations, beyond the affect of rotation, of the resonance frequencies of the CW and CCW beams. Polarization-induced errors may severely limit the accuracy of the RFOG because determination of the resonance centers for each of the resonance frequencies of the CW and CCW beams directly affects the rotational rate measurement.

In addition to encountering error mechanisms that may affect accuracy, the conventional RFOG may be cost prohibitive for high volume production, particularly for a smaller scale RFOG. The conventional RFOG is an assembly of multiple discrete components (e.g., light source, beam generator, coil, etc.) that has an associated cost for each component and for assembling such discrete components. For smaller scale applications, the cost associated with assembling the RFOG generally increases with the increased cost for miniaturizing each component and aligning the miniaturized discrete optical components.

Accordingly, it is desirable to provide a robust, compact optical rotation sensor that has a low cost and that is suitable for high volume production. In addition, it is desirable to provide a method for sensing a rotational rate of a compact, low cost optical gyro that reduces the effect of error mechanisms that decrease the accuracy of the measurement of the rotational rate. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and apparatus are provided for sensing a rotational rate of a ring resonator about an axis using thin film waveguides. In an exemplary embodiment, an optical gyro for measuring a rotation rate comprises a substrate comprising an insulator layer, a first silicon waveguide formed on the insulator layer, and a resonator coupled to the first silicon waveguide. The first silicon waveguide is configured to propagate first and second light beams therethrough. The resonator has first and second counter-propagating directions and is configured to circulate a portion of the first light beam in the first counter-propagating direction and circulate a portion of the second light beam in the second counter-propagating direction. Each of the counter-propagating directions having a resonance frequency for light propagation within the resonator. A difference in the resonance frequencies indicating the rotation rate.

In another exemplary embodiment, an optical gyro for measuring a rotation rate comprises a substrate comprising an insulator layer, at least one monochromatic light source on the substrate and configured to produce first and second light beams, a first silicon waveguide formed on top of the insulator layer, and a resonator coupled to the first silicon waveguide. The first silicon waveguide is configured to propagate the first and second light beams therethrough. The resonator is configured to direct a first circulating light beam in a first counter-propagating direction and direct a second circulating light beam in a second counter-propagating direction. The first circulating light beam is derived from a portion of the first light beam, and the second circulating light beam is derived from a portion of the second light beam. Each of the first and second circulating light beams is tuned to measure a resonance frequency when circulating in the resonator. A difference between the resonance frequencies indicating the rotation rate.

In another exemplary embodiment, a method for sensing a rotation rate of a ring resonator formed on a substrate is provided. The substrate has a silicon layer and an insulator layer. The method comprises the steps of directing first and second light beams to the ring resonator via a first silicon waveguide formed on the insulator layer, circulating a portion of the first light beam in a first counter-propagating direction of the ring resonator and a portion of the second light beam in a second counter-propagating direction of the ring resonator, and measuring a frequency shift between a first resonance frequency of the first counter-propagating direction of the ring resonator and a second resonance frequency of the second counter-propagating direction of the ring resonator. The frequency shift indicates the rotation rate.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
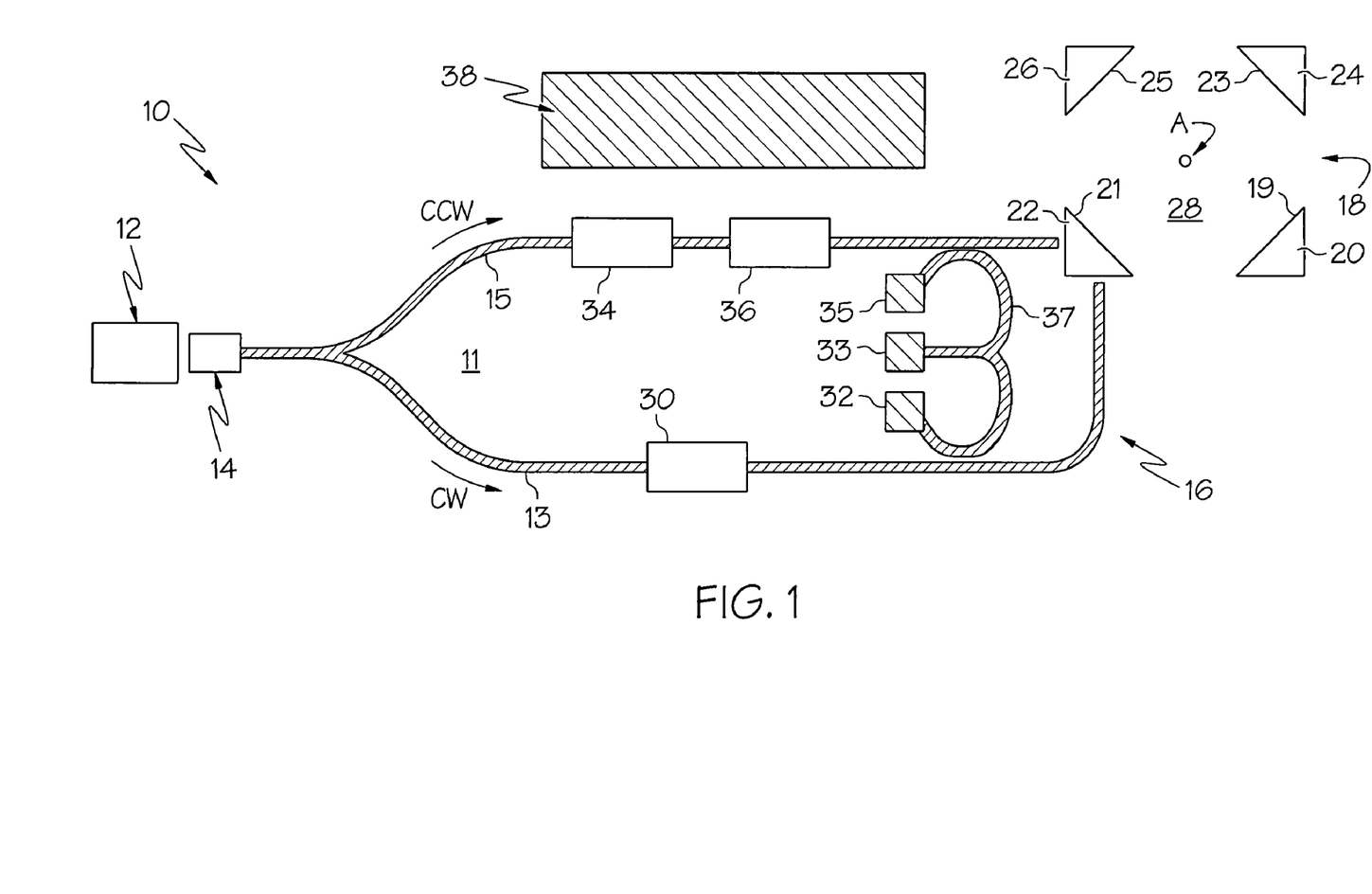
FIG. 1 is a block diagram of an optical gyro in accordance with a first exemplary embodiment of the present invention.

Referring now to the drawings, FIG. 1 is a block an optical gyro 10 in accordance with a first exemplary embodiment of the present invention. In this exemplary embodiment, one or more components of the optical gyro 10 are formed in or on a substrate 11 and interconnected with a silicon waveguide 16 formed in the substrate 11. The substrate 11 may be silicon, silicon-on-insulator (SOI), or the like, such as found in a microchip or other semiconductor related device, having one or more layers, such as an insulator layer of $SiO_2$. For simplicity of discussion, the substrate 11 is described as an SOI substrate. The optical gyro 10 comprises a light source 12 (e.g., a monochromatic laser diode), an optical phase modulation network 30, 34, 36, a ring resonator 18, a detector array 32, 33, 35, and the silicon waveguide 16 (e.g., an SOI thin film waveguide) interconnecting the light source 12, the optical phase modulation network 30, 34, 36, the detector array 32, 33, 35, and the ring resonator 18. In one exemplary embodiment, the optical gyro 10 further comprises a drive/detector circuit 38 that is coupled to the detector array 32, 33, 35 via metal interconnects (not shown) and provides the drive, control, and amplification functions of the detector array 32, 33, 35. The drive/detector circuit 38 may be a discrete device that is formed or mounted onto the substrate 11 or an integrated device that is formed in the substrate 11.

The silicon waveguide 16 routes light beams between the components of the optical gyro 10. In an exemplary embodiment, the waveguide 16 is formed by etching trenches in the silicon of the SOI substrate 11 and depositing $SiO_2$ in the trenches such that the silicon waveguide 16 is bordered by $SiO_2$. The resulting silicon waveguide 16 confines the light beams in the silicon by index guiding (e.g., using the change in the refractive index for silicon and the refractive index for $SiO_2$). In another exemplary embodiment, the silicon waveguide 16 is formed with a photonic crystal pattern in the silicon of the SOI substrate. The processes of etching layers and depositing materials applied in semiconductor fabrication techniques may be used to form the waveguide 16. Although the silicon waveguide 16 is formed on an SOI type substrate, other types of substrates and processes may be used to fabricate the silicon waveguide 16. Additionally, although the optical gyro 10 uses a silicon waveguide 16 to route the light beams from one component to another component, other materials (e.g., alumina, nitrides, III-V elements, other refractory materials, and the like) having optical properties similar to silicon and having similar refractive index contrasts (e.g., silicon and $SiO_2$) may be used for the waveguide. Although referred to as one waveguide, the silicon waveguide 16 may be a network of multiple interconnected waveguides.

The light beams routed by the silicon waveguide 16 originate from the light source 12. A coupling element 14 (e.g., a spot-size converter) is preferably used to couple the light source 12 with the silicon waveguide 16. The light source 12 is preferably implemented to exhibit frequency stability, substantially narrow line width, substantially single frequency operation, and relatively high power capability and produces first and second light beams (e.g., a clockwise (CW) beam and a counter-clockwise (CCW) beam) that propagate through the waveguide 16 to the optical phase modulation network 30, 34, 36. In an exemplary embodiment, the light source 12 is a single frequency tunable laser that generates a light beam having a frequency $f_0$, and this light beam is split (e.g., via a beam splitter (not shown) or by dividing the waveguide 16 into two portions 13 and 15) to form the first and second light beams (e.g., CW beam and CCW beam). In another exemplary embodiment, the light source 12 includes first and second tunable lasers that synthesize the first and second light beams, respectively. The first light beam produced by the first laser is tuned to a frequency $f_0$, and the second light beam produced by the second laser is tuned to a frequency $f_0+\Delta f$. In this example, the relative frequency drift and jitter between the two laser frequencies should be substantially minimized to a level that minimizes or does not affect the accuracy and stability of the frequency shift, and thus rotational rate, measurement. This can be accomplished by laser frequency stabilization techniques, such as those that use electronic servos to lock their beat frequencies to a tunable but stable offset (proportional to rotational rate).

The optical phase modulation network 30, 34, 36 modulates the first and second light beams and comprises a first modulator 30 coupled to a first portion 13 of the waveguide 16, and second and third series-coupled modulators 34 and 36 coupled to a second portion 15 of the waveguide 16. Additional or fewer modulators may be used. The first modulator 30 receives and modulates the first light beam (e.g., CW beam) from the light source 12, and the second wave modulator 34 receives and modulates the second light beam (e.g., CCW beam) from the light source 12. The third modulator 36 receives the modulated light beam from the second modulator 34 and shifts the frequency of the modulated light beam. Each of the modulators 30, 34, 36 may be any one of a p-type insulator n-type (PIN) diode, metal-oxide semiconductor (MOS) capacitor (e.g., a silicon-insulator-silicon capacitor), or other devices that may implement a modulator and that may be integrated into the waveguide 16. Each of the modulators 30, 34, 36 is capable of modulating the electrical carrier concentration and refractive index in the waveguide 16 to modulate the phase of the light beams from the light source 12. These modulated light beams are introduced to the ring resonator 18.

The ring resonator 18 comprises a set of reflective elements 20, 22, 24, 26 formed in the silicon of the SOI substrate 11, and the light beams introduced into the ring resonator 18 are circulated in counter-propagating directions (e.g., CW and CCW directions) via the reflective elements 20, 22, 24, 26 in a silicon region 28 (e.g., of the silicon layer in the SOI substrate 11) between the reflective elements 20, 22, 24, 26. In one exemplary embodiment, the reflective elements 20, 22, 24, 26 are trenches etched in the silicon of the SOI substrate 11 and deposited with $SiO_2$. A reflective surface 19, 21, 23, 25 is formed on each of the reflective elements 20, 22, 24, 26, respectively, by the refractive index contrast between silicon and $SiO_2$. In another exemplary embodiment, the reflective elements 20, 24, and 26 are photonic crystal hole structures etched in the silicon of the SOI substrate 11 and filled with $SiO_2$ that produce the reflective surfaces 19, 23, and 25, respectively.

A first reflective element 22 introduces a portion of each of the modulated light beams into the ring resonator 18, and the reflective surfaces 19, 21, 23, 25 of the reflective elements 20, 22, 24, 26 are positioned to circulate these light beams (e.g., a first circulating light beam or CW circulating beam and a second circulating light beam or CCW circulating beam) in the ring resonator 18. For example, the CW beam introduced by the reflective element 22 is directed to the reflective element 26, to the reflective element 24, to the reflective element 20, and back to the reflective element 22, thus propagating in the CW direction along a closed optical path in the silicon region 28. Conversely, the CCW beam introduced by the reflective element 22 is directed to the reflective element 20, to the reflective element 24, to the reflective element 26, and to the reflective element 22 thus propagating in the CCW direction along the closed optical path in the silicon region 28. Additional reflective elements or a faceted cavity may be formed in the silicon of the SOI substrate 11 to increase the path length of the closed optical path.

For rotation sensing, the frequency $f_0$ of the first light beam (e.g., CW beam) is tuned (e.g., by tuning the frequency of the light source 12) to the resonance frequency of the ring resonator 18 in the CW direction. The modulator 36 tunes the frequency $\Delta f$ to align the second light beam (e.g., CCW beam) frequency with a resonance center relative to the resonance frequency of the ring resonator 18 in the CCW direction. During rotation sensing, the modulator 36 shifts the frequency of the second light beam by an amount $\Delta f$ and directs the frequency shifted light to the ring resonator 18 to propagate in the CCW direction.

In one exemplary embodiment, the modulator 36 uses a serrodyne modulation waveform to accomplish frequency shifting. For example, the CCW light beam from the light source 12 is phase modulated with a serrodyne signal whereby a phase ramp is applied to the input light beam (CCW beam). By driving the modulator 36 with a continuous and linear phase ramp, a frequency shift may be obtained, that is proportional to the slope of the phase ramp. A sawtooth waveform having a $2\pi$ phase height and a frequency $\Delta f$ produces substantially equivalent results as the continuous ramp, and the sawtooth frequency ($\Delta f$) may be adjusted to track the CCW resonance in the presence of rotation. Another exemplary method for accomplishing a frequency shift is the use of an acousto-optic frequency shifter. In this method, the acoustic-optic frequency shifter may be an acousto-optic device formed or placed onto the substrate 11.

The CW and CCW circulating light beams produce light outputs from the ring resonator 18 to the silicon waveguide 16 via reflective element 22. When the input light beams are tuned to the resonance frequencies of the counter-propagating directions of the ring resonator 18, a resonance lineshape may be detected by the detectors 32 and 35 in the detector array 32, 33, 35. For example, a first detector 32 detects the resonance lineshape associated with the CCW circulating light beam, and a second detector 35 detects the resonance lineshape associated with the CW circulating light beam. Each of the detectors of the detector array 32, 33, 35 may be a germanium diode, or similar device, formed in the silicon waveguide 16 or a discrete device mounted on the silicon waveguide 16, and additional or fewer detectors may be used. The detectors monitor the incident and return signals (e.g., CW and CCW input light beams and the light outputs of the CW and CCW circulating light beams). The detector 33 measures the beat frequency between the input beams to the resonator 18, which is a measure of the resonance frequency shift due to the rotation rate.

To measure the resonance center-frequencies of the closed optical path, in either the CW direction or CCW direction, a standard synchronous detection technique is used. Each input light beam (e.g., CW beam and CCW beam) is sinusoidally phase-modulated in modulators 30 and 34, and therefore frequency modulated at frequencies $f_m$ and $f_n$, respectively, to dither each input beam frequency across a resonance lineshape as measured by the detectors 35 and 32 in the detector array 32, 33, 35. For example, the drive/detector circuit 38 coupled to the detector array 32, 33, 35 demodulates the output of the detectors 35 and 32 at frequencies $f_m$ and $f_n$, respectively, to measure resonance centers indicated by the light outputs of the CW and CCW circulating light beams. At a line center of the resonance lineshape, or the resonance center, the detectors 35 and 32 detect a minimum output at the fundamental frequencies $f_m$ and $f_n$, respectively. In an exemplary embodiment, if the input beam frequency (e.g., $f_0+\Delta f$ or $f_0$) is off-resonance, an error signal at frequencies $f_m$ and $f_n$, respectively, is sensed by the detectors 35 and 32 and used to tune the respective beam frequency to the respective resonance frequency of the ring resonator 18. The frequency of the CW beam is tuned by changing the frequency of the laser, $f_0$, and the frequency of the CCW beam is adjusted via a feedback loop that changes the frequency shift, $\Delta f$, of the modulator 36 so that $f_0+\Delta f$ matches the CCW resonance frequency of the resonator 18.

When $f_0+\Delta f$ is tuned away from the resonance frequency of the ring resonator 18 in the CCW direction, the energy from the CCW beam does not produce a maximum intensity at the optical sensor 16. When $f_0+\Delta f$ is tuned at the resonance frequency of the ring resonator 18 in the CCW direction, the CCW beam has a minimum output, i.e., a resonance dip, thereby indicating the resonance center. Similarly for the CW beam, the energy of the CW beam enters the closed optical path of the ring resonator 18 when the CW beam is tuned to the resonance frequency of the ring resonator 18 in the CW direction.

In the absence of rotation, the round-trip path-lengths of the CW and CCW circulating light beams inside the ring resonator 18 in the CW and CCW direction, respectively, are substantially equal. Thus, $\Delta f$ is tuned to zero by the modulator 36. In the presence of rotation, the round-trip path-lengths differ between the CW and the CCW directions producing a resonance frequency difference between the two directions that is proportional to the rotation rate. By tuning the frequency $f_0$ to track the CW resonance and the frequency $\Delta f$ to track the CCW resonance center, the rotation rate is determined. By application of the well-known Sagnac Effect, the optical gyro 10 senses a rotation rate about an axis (A) of the ring resonator 18. In an exemplary embodiment, the drive/detector circuit 38 determines the rotation rate based on the resonance frequency difference between the two directions of the closed optical path of the ring resonator 18.

Figure 2:
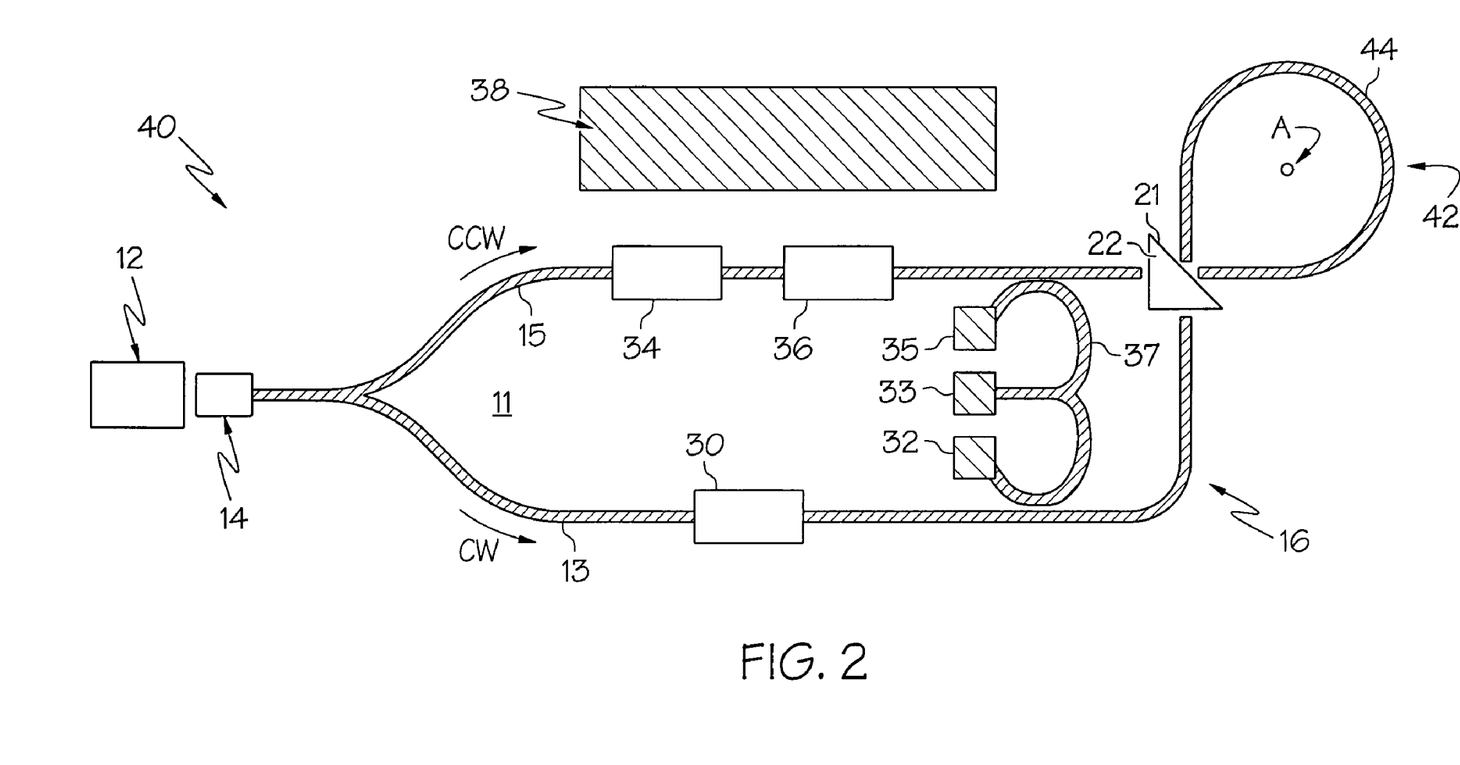
FIG. 2 is a block diagram of an optical gyro in accordance with a second exemplary embodiment of the present invention.

FIG. 2 is a block diagram of an optical gyro 40 in accordance with a second exemplary embodiment of the present invention. In this exemplary embodiment, the optical gyro 40 replaces the ring resonator 18, shown in FIG. 1, with a ring resonator 42. The ring resonator 42 comprises the reflective element 22 and a second silicon waveguide 44 coupled to the reflective element 22. The modulated light beams are introduced to the silicon waveguide 44 via the reflective element 22 to propagate in the CW and CCW directions, respectively. The silicon waveguide 44 may be formed in a similar manner and has similar optical properties as the silicon waveguide 16. For example, the silicon waveguide 44 is formed by etching trenches in the silicon of the SOI substrate 11 and depositing $SiO_2$ in the trenches or arrays of holes such that the silicon waveguide 44 is bordered by $SiO_2$. In another exemplary embodiment, the silicon waveguide 44 is formed with a photonic crystal pattern in the silicon of the SOI substrate 11. In addition, the reflective element 22 may be replaced with an optical coupler fabricated from two coupled waveguides, each of which is made from the same structure as the resonator waveguide.

The CW and CCW circulating light beams are directed by the silicon waveguide 44 in counter-propagating directions (e.g., CW and CCW directions, respectively) from one end of the silicon waveguide 44 to the other end and reflected by the reflective element 22. The path length of the silicon waveguide 44 may be modified (e.g., encircle the optical gyro 40) to encircle a greater effective area and thereby adjust the sensitivity of optical gyro 40 to rotation about the axis A, via the Sagnac effect. The axis of rotation A is perpendicular to the plane of the silicon waveguide 44. For example, the silicon waveguide 44 is preferably a substantially circular shape, maximizing the area of the waveguide 44, and the axis A is perpendicular to the plane of the waveguide.

Figure 3:
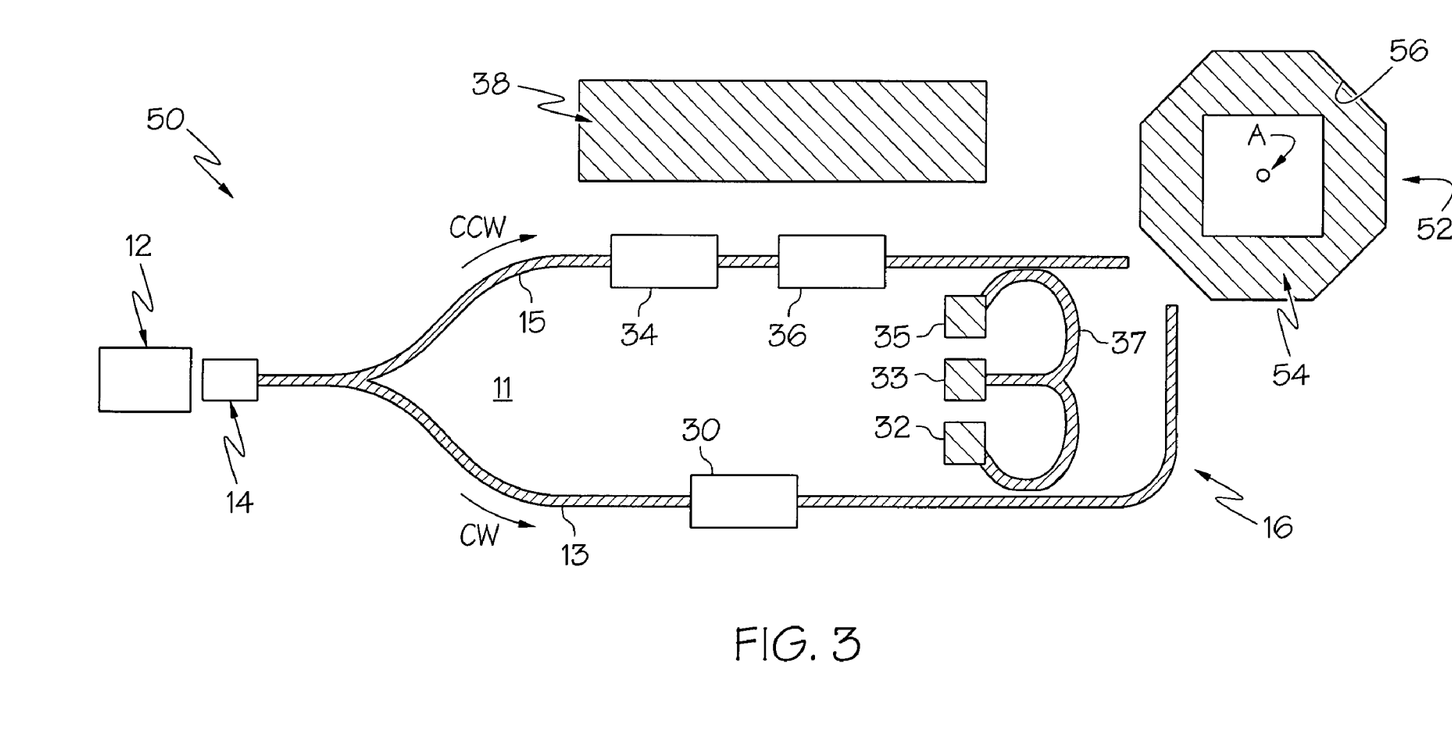
FIG. 3 is a block diagram of an optical gyro in accordance with a third exemplary embodiment.

FIG. 3 is a block diagram of an optical gyro 50 in accordance with a third exemplary embodiment of the present invention. In this exemplary embodiment, the optical gyro 50 replaces the ring resonator 18, shown in FIG. 1, with a ring resonator 52. The ring resonator 52 comprises a trench 54, etched in the silicon of the SOI substrate 11, having a surface 56 that circulates portions of the input light beam (e.g., CW light beam or CCW light beam) in free space along a closed optical path around an axis A of the ring resonator 52. The path of light beams enclosed by the surface 56 is free space, either vacuum, air, or other gas, such that the index of refraction experienced by the light in the trench is substantially unity as compared with a solid medium. The closed optical path encircles an effective area. The surface 56 may be mirrored to increase the reflective properties of the surface 56. The trench 54 may be enlarged to expand the surface 56 and increase the effective area, thereby increasing the sensitivity of the optical gyro 50 to rotation about the axis A via the Sagnac effect. Alternatively, the surface 56 may be constructed of multiple reflecting surfaces to direct the CW and CCW circulating light beams along one or more loops encircling the effective area to thereby increasing the signal to noise sensitivity of the optical gyro 50 to rotation about the axis A via the Sagnac effect. Using multiple reflecting surfaces, the path length of the closed optical path may be increased while substantially preserving the effective area encircled by the light beam.

Figure 4:
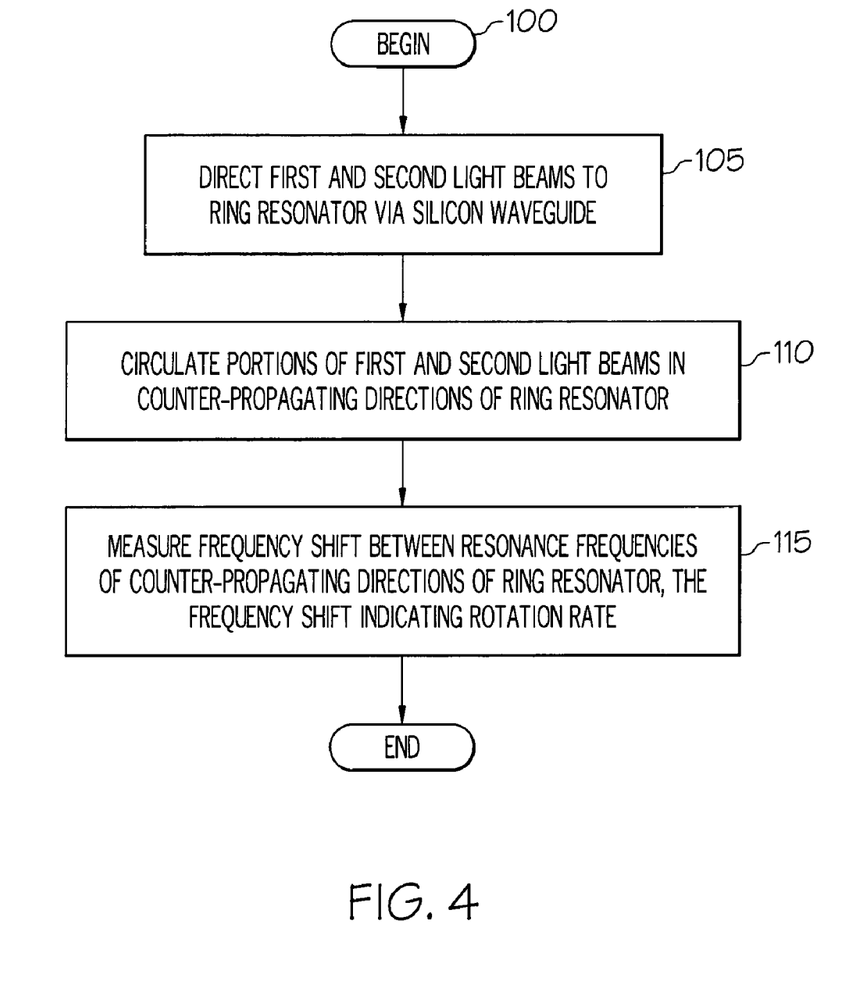
FIG. 4 is a flow diagram of a method for sensing a rotation rate of a ring resonator in accordance with an exemplary embodiment of the present invention.

FIG. 4 is a flow diagram of a method 100 for sensing a rotation rate of a ring resonator in accordance with an exemplary embodiment of the present invention. The ring resonator is formed in a substrate having an insulator layer and a silicon layer. The first and second light beams are directed to the ring resonator via a first silicon waveguide formed in or on the insulator layer at step 105. A portion of the first light beam, or first circulating light beam, is circulated in a first counter-propagating direction (e.g., CW direction) of the ring resonator and a portion of the second light beam, or second circulating light beam, is circulated in a second counter-propagating direction (e.g., CCW direction) of the ring resonator at step 110. The first circulating light beam measures or is tuned to a first resonance frequency associated with propagation in the CW direction of the ring resonator, and the second circulating light beam measures or is tuned to a second resonance frequency associated with propagation in the CCW direction. The first and second circulating light beams are directed along a closed optical path in a portion of the silicon layer. In one exemplary embodiment, the ring resonator comprises a set of reflecting elements formed in the silicon layer, each of the set of reflecting elements comprising $SiO_2$. The first and second circulating light beams are directed along a closed optical path in the silicon layer by these reflecting elements. In another exemplary embodiment, the ring resonator comprises a set of reflecting elements each comprising a structure of photonic crystal holes formed in the silicon layer. The first and second circulating light beams are directed along a closed optical path in the silicon layer by these reflecting elements. In yet another exemplary embodiment, the ring resonator comprises a trench formed in the silicon layer. The trench has a reflective surface, and the first and second circulating light beams are directed along a closed optical path in free space via the reflective surface of the trench. A frequency shift is measured between the first resonance frequency (e.g., of the first counter-propagating direction (CW direction) of the ring resonator) and the second resonance frequency (e.g., of the second counter-propagating direction (CCW direction) of the ring resonator at step 115. The frequency shift indicates the rotation rate.

Advantages of each of the disclosed optical gyros 10, 40, 50 include, but are not limited to: a capability of providing about a 1 deg/hr bias and about a 0.1 deg/root-hr angle random walk (ARW) in a low-cost, small-sized package; a resonator having a very low loss; use of a high reflectivity mirror rather than an optical coupler using waveguides to circulate light in the ring resonator; a compact, stable laser component that can be mounted on a silicon optical bench or an optical bench using a different substrate material; ease of coupling light from the source to the resonator; ease of interfacing to signal processing electronics in the same platform as the optics or ease of integration and electronics in the same platform; elimination of non-linear effects in silica fibers or other waveguide materials that may promote gyro errors; substantial reduction of light loss at transition point to resonator 14; a capability of circulating the light beams in very tight (e.g., pencil diameter or smaller) loops with little to no change in light transmission properties.

In one exemplary embodiment, the optical gyro 10, 40, 50 is constructed with an SOI electro-optical circuit that integrates electronics and optics and provides an efficient, expedient, self-aligned, and mechanically stable interface between the two. Optical functions, such as associated with the coupling element 14 and the modulators 30, 34, and 36 may be formed in the thin silicon film of the SOI substrate. Since the optical and electrical characteristics of the silicon film are compatible, signal processing circuitry and optical sensing elements can also be integrated into the silicon layer, and miniature optical components having a feature size of as little as 10 microns may be mounted on silicon surfaces to eliminate large bulk optics, even when the light wave is needed to travel in free space instead of in a waveguide, such as in the resonator path itself. Laser diodes and external elements for stabilizing their frequency may also be mounted on the top surface of the substrate. In this exemplary embodiment, the laser and any related frequency tuning components may be mounted on the substrate, and using the serrodyne method for frequency shifting enables the use of an integrated optical phase modulator in a silicon waveguide for the frequency shifter. Other ways of coupling light from free space optics to waveguides may be incorporated, such as the use of tapered or graded index structures that adiabatically couple light into the waveguide, or the use of gratings or prisms. The use of these techniques allows the fabrication of optics in a silicon platform and thus integrated with the electronics.

The optical gyro 10, 40, 50 is suited to a variety of applications including, by way of example and not of limitation, applications requiring inertial guidance such as aircraft, land vehicle, submarine, satellite, surface ship navigation, and the like. In addition, the relatively small size envisioned for the optical gyro 10 would enable a practical usage on very small platforms including, by way of example and not of limitation, small robots, individual soldier footwear, and small-scale satellites.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical gyro for measuring a rotation rate, the optical gyro comprising:
   a substrate comprising an insulator layer;
   a first silicon waveguide formed on said insulator layer, said first silicon waveguide configured to propagate first and second light beams therethrough; and
   a resonator coupled to said first silicon waveguide and having at least one reflecting element and first and second counter-propagating directions, said at least one reflecting element configured to circulate a portion of said first light beam in said first counter-propagating direction and circulate a portion of said second light beam in said second counter-propagating direction, each of said first and second counter-propagating directions having a resonance frequency for light propagation within said resonator, a difference between said resonance frequencies indicating the rotation rate.

2. An optical gyro according to claim 1, wherein said substrate, said first silicon waveguide, and said resonator together form a monolithic structure.

3. An optical gyro according to claim 1, wherein said substrate further comprises a silicon layer; and wherein said at least one reflecting element comprises a set of reflecting elements formed in said silicon layer, each of said set of reflecting elements comprising at least one of a dielectric material and a metal material, a first reflecting element of said set of reflecting elements coupled to said first silicon waveguide and configured to receive said first and second light beams, said set of reflecting elements configured to circulate said portions of said first and second light beams in a closed optical path in said silicon layer.

4. An optical gyro according to claim 3, wherein each of said set of reflecting elements comprises a surface configured to reflect said portions of said first and second light beams.

5. An optical gyro according to claim 1, wherein said substrate further comprises a silicon layer; and wherein said resonator comprises:
   an input element formed in said silicon layer and comprising at least one of the group consisting of SiO.sub.2, a dielectric material, and a metal; and
   wherein the at least one reflecting element comprises a set of reflecting elements each comprising a structure of photonic crystal holes formed in said silicon layer, said input element and said set of reflecting elements together configured to circulate said portions of said first and second light beams in a closed optical path in said silicon layer.

6. An optical gyro according to claim 1, wherein said resonator comprises:
   a silicon layer;
   an input element formed in said silicon layer and comprising a dielectric material and silicon, said input element configured to receive said first and second light beams; and
   a second silicon waveguide coupled to said input element and configured to circulate said portions of said first and second light beams therethrough.

7. An optical gyro according to claim 1, wherein said substrate further comprises a silicon layer; and wherein said resonator comprises:
   a trench formed in said silicon layer, said trench having a surface configured to circulate said portions of said first and second light beams through a free space.

8. An optical gyro according to claim 7, wherein said resonator further comprises a reflective coating on said surface of said trench.

9. An optical gyro according to claim 1 further comprising:
   at least one modulator coupled to said first silicon waveguide and configured to modulate at least one of said first and second light beams; and
   at least one detector coupled to said first silicon waveguide, wherein said resonance frequency of said first light beam indicates a resonance frequency of said first counter-propagating direction and a frequency of said second light beam is tuned to indicate a resonance frequency of said second counter-propagating direction, and wherein said at least one detector is configured to determine a difference between said resonance frequency of said first counter-propagating direction and said resonance frequency of said second counter-propagating direction, said difference proportional to a rotation rate of said resonator.

10. An optical gyro for measuring a rotation rate, the optical gyro comprising:
a substrate comprising an insulator layer;
at least one monochromatic light source on said substrate and configured to produce first and second light beams;
a first silicon waveguide formed on top of said insulator layer, said first silicon waveguide configured to propagate said first and second light beams therethrough; and
a resonator coupled to said first silicon waveguide and having at least one reflecting element configured to direct a first circulating light beam in a first counter-propagating direction and direct a second circulating light beam in a second counter-propagating direction, said first circulating light beam derived from a portion of said first light beam, said second circulating light beam derived from a portion of said second light beam, each of said first and second circulating light beams having a resonance frequency when circulating in said resonator, a difference between said first and second resonance frequencies indicating the rotation rate.

11. An optical gyro according to claim 10 further comprising:
an optical phase modulation network coupled to said first silicon waveguide, said first silicon waveguide having an electrical carrier concentration and a refractive index, said optical phase modulation network configured to modulate said electrical carrier concentration and said refractive index to modulate said first and second light beams;
a detector array coupled to said first silicon waveguide and configured to sample said first and second circulating light beams; and
a detection circuit coupled to said detector array and configured to determine said resonance frequencies of said first and second circulating light beams.

12. An optical gyro according to claim 11, wherein said substrate further comprises a silicon layer, wherein said first silicon waveguide comprises a thin film, and wherein at least one of said optical phase modulation network, said detector array, and said detection circuit is formed in one of said silicon layer and said thin film.

13. An optical gyro according to claim 11, wherein at least one of said optical phase modulation network, said detector array, and said detection circuit is a discrete element coupled to said substrate.

14. An optical gyro according to claim 11, wherein said optical phase modulation network comprises at least one element selected from a p-type intrinsic n-type (PIN) diode and a metal oxide semiconductor (MOS) capacitor.

15. An optical gyro according to claim 11, wherein said detector array comprises at least one diode containing germanium.

16. A method for sensing a rotation rate of a ring resonator formed on a substrate, the substrate having a silicon layer and an insulator layer, the method comprising the steps of:
directing first and second light beams to the ring resonator via a first silicon waveguide formed in the insulator layer;
circulating, with at least one reflecting element of the ring resonator, a portion of the first light beam in a first counter-propagating direction of the ring resonator and a portion of the second light beam in a second counter-propagating direction of the ring resonator; and
measuring a frequency shift between a first resonance frequency of the first counter-propagating direction of the ring resonator and a second resonance frequency of the second counter-propagating direction of the ring resonator, the frequency shift indicating the rotation rate.

17. A method according to claim 16, wherein said circulating step comprises directing the portions of the first and second light beams along a closed optical path in a portion of the silicon layer.

18. A method according to claim 16, wherein the at least one reflecting element comprises a set of reflecting elements formed in the silicon layer, each of the set of reflecting elements comprising one of at least one dielectric material and at least one metal material, and wherein said circulating step comprises directing the portions of the first and second light beams along a closed optical path in the silicon layer by the set of reflecting elements.

19. A method according to claim 16, wherein the at least one reflecting element comprises a set of reflecting elements each comprising a structure of photonic crystal holes formed in the silicon layer, and wherein said circulating step comprises directing the portions of the first and second light beams along a closed optical path in the silicon layer by the set of reflecting elements.

20. A method according to claim 16, wherein the ring resonator comprises a trench formed in the silicon layer, the trench having a reflective surface, and wherein said circulating step comprises directing portions of the first and second light beams along a closed optical path in free space via the reflective surface of the trench.

* * * * *